United States Patent [19]

Yoshizawa et al.

[11] Patent Number: 4,948,422

[45] Date of Patent: Aug. 14, 1990

[54] METHOD OF MANUFACTURING SUPERFINE MAGNETIC METAL POWDER

[75] Inventors: Akinori Yoshizawa, Nakanodaini Corpo No. 1102, 24-16, Nakano 5-chome, Nakano-ku, Tokyo 164; Tomoo Maeda; Masayuki Yamato, both of Tokyo, all of Japan

[73] Assignees: Akinori Yoshizawa; Nippon Kokan Kabushiki Kaisha, both of Tokyo, Japan

[21] Appl. No.: 309,552

[22] PCT Filed: Jun. 6, 1988

[86] PCT No.: PCT/JP88/00545

§ 371 Date: Feb. 2, 1989

§ 102(e) Date: Feb. 2, 1989

[87] PCT Pub. No.: WO88/10002

PCT Pub. Date: Dec. 15, 1988

[30] Foreign Application Priority Data

Jun. 10, 1987 [JP] Japan .................................. 62-144825

[51] Int. Cl.⁵ ............................................. B22F 9/28
[52] U.S. Cl. ........................................................ 75/348
[58] Field of Search ................................... 75/0.5 BA

[56] References Cited

U.S. PATENT DOCUMENTS 4,383,852 5/1983 Yoshizawa et al. ............ 75/0.5 BA
4,526,611 7/1985 Yoshizawa et al. ............ 75/0.5 BA

FOREIGN PATENT DOCUMENTS 57-26101  2/1982 Japan ............................. 75/0.5 BA
59-170211 9/1984 Japan .
60-15822  1/1985 Japan .
61-2221365 10/1986 Japan .

Primary Examiner—John P. Sheehan
Attorney, Agent, or Firm—Frishauf, Holtz, Goodman & Woodward

[57] ABSTRACT

In the present invention, reaction is carried out between hydrogen gas and a metal halide vapor while supplying to the reacting region an active gas whose reactivity with the metal halide vapor is higher than the reactivity of the hydrogen gas with the metal halide vapor. The particular technique permits efficiently manufacturing a superfine magnetic metal powder of satisfactory properties while minimizing the amount of the hydrogen gas used.

18 Claims, 1 Drawing Sheet

METHOD OF MANUFACTURING SUPERFINE MAGNETIC METAL POWDER

Technical Field

The present invention relates to a method of efficiently manufacturing a superfine magnetic metal powder used as a high density magnetic recording medium.

Background Art

Presently, a superfine magnetic metal powder for magnetic recording is manufactured industrially as follows. In the first step, a needle-like iron oxide is prepared by a wet precipitation method, followed by applying a treatment to prevent sintering to the needle-like iron oxide. Further, dehydration, reduction and deoxidation treatments are applied to the needle-like iron oxide so as to obtain the desired superfine magnetic metal powder. Clearly, the conventional method involves many treating steps, leading to a high manufacturing cost of the superfine magnetic metal powder.

As an alternative to the conventional method outlined above, a gaseous phase evaporation method, a melt reducing method, a gaseous phase chemical reaction method, etc. are now under study. However, any of these methods is still incapable of sufficiently reducing the manufacturing cost of the superfine magnetic metal powder, leaving room for further improvement before the industrial application.

The gaseous phase chemical reaction method utilizes in principle a gaseous phase chemical reaction between a metal halide vapor and hydrogen gas to produce a superfine magnetic metal powder. Some improvements are being proposed with respect to the gaseous phase chemical reaction method as follows:

1. Japanese Patent Publication No. 59-7765 teaches that a metal halide vapor stream and a hydrogen gas stream are introduced at different flowing speeds to form an unstable region at the interface between the two. It is taught that the formation of the unstable region permits promoting the growth of nuclei, leading to an improved yield of the fine magnetic metal powder.

However, it is difficult to obtain a superfine powder having a particle size of 100 to 300 Å, which can be used for high density magnetic recording. The particle size of the powder obtained by this prior art is in general about 400 to 6000 Å.

2. Japanese Patent Publication No. 61-60123 teaches an improvement of prior art 1 given above. It is taught that the gaseous reaction mixture is rapidly cooled immediately after the reaction between the metal halide vapor and hydrogen gas in the unstable region at the interface. In this prior art 2, a magnetic field is applied in some cases to the unstable region at the interface.

Prior art 2 is superior to prior art 1 in that it is possible to suppress the growth of the powder particles. In order to increase the yield of the superfine powder, however, prior art 2 requires a large amount of hydrogen gas, leading to a high manufacturing cost of the superfine magnetic metal powder.

The present inventors have studied in detail prior arts 1 and 2 outlined above. It has been found that the reactivity between the metal halide vapor and hydrogen gas is low, resulting in an insufficient nuclei formation. It has also been found that nonuniform nuclei formation brings about an abnormal particle growth. In each of prior arts 1 and 2, it is necessary to use a large amount of hydrogen gas in order to form superfine nuclei sufficiently by promoting a uniform nuclei formation. However, the increase in the amount of hydrogen gas boosts the manufacturing cost of the superfine magnetic metal powder.

Disclosure of the Invention

An object of the present invention is to provide a method of manufacturing a superfine magnetic metal powder which permits minimizing the amount of hydrogen gas used and also permits efficiently manufacturing a superfine magnetic metal powder having satisfactory properties.

The method of the present invention is characterized in that at least one kind of metal halide vapor is reacted with hydrogen gas while supplying to the reacting region an active gas whose reactivity with the metal halide vapor is higher than the reactivity of hydrogen gas with the metal halide vapor so as to manufacture a desired superfine magnetic metal powder.

The metal halides used in the present invention include, for example, metal chlorides such as $FeCl_2$, $CoCl_2$ and $NiCl_2$.

The active gas which is introduced into the reaction system together with hydrogen gas should be higher in reactivity with the metal halide than the hydrogen gas. Any of reducing, and oxidizing gases can be used as the active gas as far as this requirement is satisfied. For example, a reducing gas such as $H_2S$ gas or an oxidizing gas such as $O_2$ gas can be used as the active gas. It is desirable to use the active gas in an amount of 0.001 to 10.0% based on the amount of the hydrogen gas.

In the case of using a reducing gas such as hydrogen sulfide gas, it is possible to use a mixture of the reducing gas with hydrogen gas. Where an oxidizing gas such as oxygen gas is used, however, it is necessary to supply the oxidizing gas and hydrogen gas separately such that the reaction between the hydrogen gas and oxidizing gas does not take place before the reaction with the metal halide. It is also desirable to carry out the reaction between the metal halide and the hydrogen gas immediately after the reaction between the metal halide and the oxidizing gas.

The reactions of the metal halide with the active gas and with the hydrogen gas are carried out in general at 900° to 1200° C. It is possible to apply a magnetic field to the reacting region. Incidentally, it is unnecessary to make the flowing speed of the metal halide vapor stream different from that of the hydrogen gas stream or active gas stream.

In the present invention, the reaction between the metal halide vapor and the active gas preferentially takes place before the reaction between the metal halide vapor and the hydrogen gas. Very fine nuclei are formed uniformly in the reacting region. For example, FeS nuclei or $Fe_2O_3$ nuclei are formed as noted below:

$$FeCl_2 + H_2S \rightarrow FeS + 2HCl \ldots \quad (I)$$

$$FeCl_2 + 3/2 O_2 \rightarrow Fe_2O_3 + 2Cl_2 \ldots \quad (II)$$

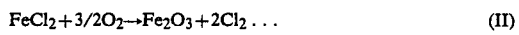

Upon formation of the nuclei, the reaction between the metal halide vapor and the hydrogen gas readily takes place on the surface of the nucleus as noted below:

$$FeCl_2 + H_2 \rightarrow Fe + 2HCl \ldots \quad (III)$$

It follows that it is possible to minimize the amount of the costly hydrogen gas used in the process. In addition, it is possible to efficiently manufacture a superfine magnetic metal powder of good properties, which can be used as a high density magnetic recording medium.

As described previously, it is desirable to use the active gas in an amount of 0.001 to 10.0% based on the amount of the hydrogen gas. Where the amount of the active gas is less than 0.001%, the nucleus forming reaction does not take place sufficiently. Thus, in the case of using a small amount of hydrogen gas, abnormal particle growth is brought about, making it difficult to obtain a superfine powder or leading to a low yield of a superfine powder. On the other hand, the reaction between the metal halide and the active gas takes place excessively, if the amount of the active gas exceeds 10.0%. As a result, the nucleus becomes unduly large. Alternatively, non-magnetic components are excessively formed by the reaction between the active gas and the metal halide depending on the kind of the active gas used, leading to unsatisfactory properties of the superfine powder. More desirably, the active gas should be used in an amount of 0.01 to 5.0% based on the amount of the hydrogen gas.

Best Mode of Embodying the Invention

Let us describe a method according to one embodiment of the present invention with reference to the accompanying drawings.

Figure 1:
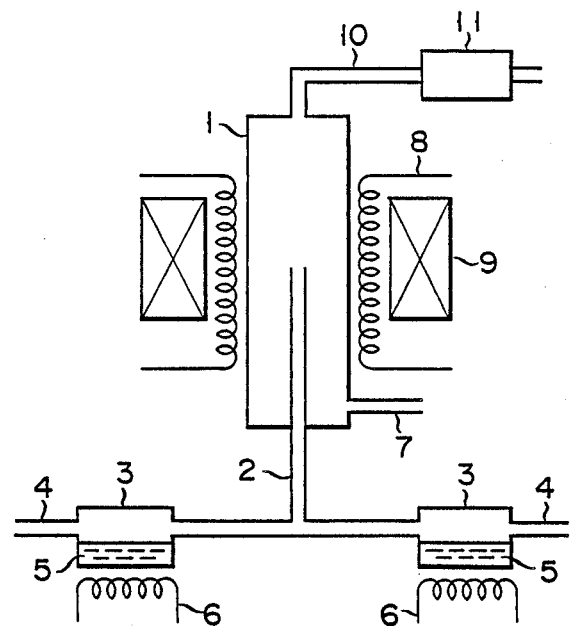
FIG. 1 schematically shows an apparatus for embodying the method of the present invention.

FIG. 1 schematically shows an apparatus for embodying the method of the present invention. As seen from the drawing, the apparatus comprises a vertical reactor 1, a feed gas supply pipe 2 extending upward into the reactor 1, and a boiler 3 disposed outside the reactor 1 and connected to the feed gas supply pipe 2. A carrier gas supply pipe 4 is connected to the boiler 3 having a metal halide 5 housed therein. The metal halide 5 is melted by heating of a resistance heater 6 disposed outside the boiler 3. The apparatus further comprises a hydrogen gas supply pipe 7 connected to the bottom part of the vertical reactor 1, a resistance heater 8 surrounding the reactor 1 and a solenoid coil 9 also surrounding the reactor 1. Still further, a gas discharge pipe 10 extending through a powder collector 11 is connected to the upper part of the vertical reactor 1.

For producing a superfine magnetic metal powder, the temperature within the reactor 1 is set at 900° to 1200° C. by energizing the resistance heater 8. Also, a magnetic field is applied, as desired, to the reacting region by energizing the solenoid coil 9. Under this condition, a carrier gas such as $N_2$ gas or Ar gas is supplied to the reactor 1 through the carrier gas supply pipe 4. Also, the metal halide vapor within the boiler 3 is upwardly supplied through the feed gas supply pipe 2 into the reactor 1 together with the carrier gas. Further, a reducing gas, e.g., hydrogen sulfide gas, is supplied through the hydrogen gas supply pipe 7 into the reactor 1 together with a hydrogen gas. As a result, the metal halide vapor reacts with the reducing gas and with the hydrogen gas in the reacting region upward of the upper end of the feed gas supply pipe 2. It should be noted that the metal halide vapor reacts first with the reducing gas and, then, with the hydrogen gas. The gaseous reaction mixture passes through the gas discharge pipe 10 such that the superfine magnetic metal powder formed by the reaction is collected by the powder collector 11.

A superfine magnetic metal powder was actually manufactured by using the apparatus shown in FIG. 1. In this experiment, the reaction temperature was set at 1000° C., and a magnetic field of 300 Oe was applied to the reacting region. Under this condition, a nitrogen gas containing 2% of $FeCl_2$ vapor was supplied through the feed gas supply pipe 2 into the reactor 1 at a flow rate of 1 mol/min. Also, a hydrogen gas containing 0.1% of $H_2S$ gas was supplied through the hydrogen gas supply pipe 7 into the reactor 1 at a flow rate of 0.5 mol/min. The flowing speed of the nitrogen gas was equal to that of the hydrogen gas.

The superfine magnetic metal powder obtained in this experiment was found to have a particle size of 200 to 250 Å, a specific surface area of 30 $m^2/g$, a coercive force of 1600 Oe and a saturation magnetization of 145 emu/g, which are substantially equal to those of the magnetic powder obtained by the method disclosed in Japanese Patent Publication No. 61-60123 referred to previously. In the test for this prior art, a hydrogen gas was supplied at a rate of 2 mols/min and the gas flowing speed was controlled. Also, the gaseous reaction mixture was rapidly cooled and a strong magnetic field was applied to the reacting region.

It should be noted that the amount of hydrogen gas used in the method of the present invention was one fourth the amount in the prior art. What should also be noted is that control of the gas flowing speed and rapid cooling of the gaseous reaction mixture were quite unnecessary in the present invention, though a weak magnetic field was applied to the reacting region in the present invention. It has been confirmed by the experiment described above that the method of the present invention makes it possible to manufacture easily a superfine magnetic metal powder of satisfactory properties.

In the case of using an oxidizing gas such as oxygen gas as the active gas, it is necessary to supply the hydrogen gas and the oxidizing gas separately so as to prevent the reaction between the hydrogen gas and the oxidizing gas before occurrence of the reaction of the metal halide with these gases. Further, it is desirable to carry out the reaction between the metal halide and the hydrogen gas immediately after the reaction between the metal halide and the oxidizing gas. The apparatus shown in, for example, FIG. 2 is constructed to meet these requirements.

Figure 2:
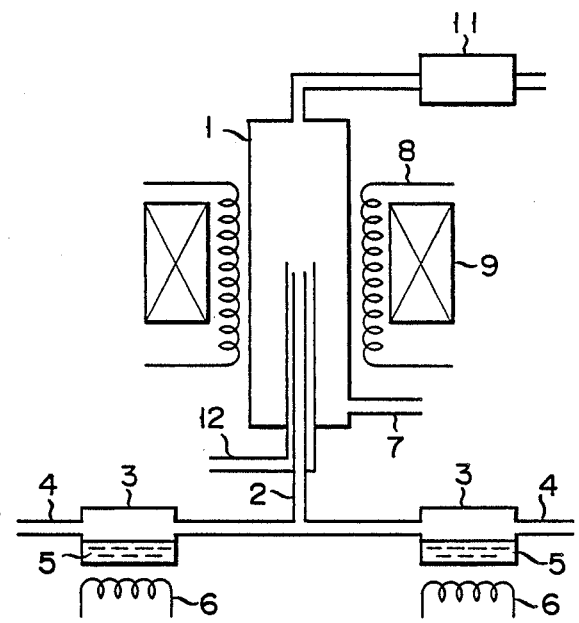
FIG. 2 schematically shows another apparatus for embodying the method of the present invention.

The apparatus shown in FIG. 2 is substantially equal to the apparatus shown in FIG. 1, except that an oxidizing gas supply pipe 12 extending into the reactor 1 is provided in FIG. 2. As seen from FIG. 2, the oxidizing gas supply pipe 12 is disposed to surround the feed gas supply pipe 2. Also, the upper end of the pipe 12 is positioned somewhat higher than the upper end of the pipe 2. The reference numerals common with FIGS. 1 and 2 denote the same members of the apparatus.

The apparatuses shown in FIGS. 1 and 2 are substantially equal to each other in the operation, too, except that, in FIG. 2, a hydrogen gas alone is supplied to the reactor 1 through the hydrogen gas supply pipe 7. In the apparatus of FIG. 2, an inert gas such as nitrogen gas or argon gas, which contains an oxidizing gas, e.g., oxygen gas, is supplied through the oxidizing gas supply pipe 12. In this case, the metal halide vapor reacts first with the oxidizing gas and, then, with the hydrogen gas in the reacting region upward of the upper end of the feed gas supply pipe 2.

The method of the present invention for manufacturing a superfine magnetic metal powder permits minimizing the amount of hydrogen gas used and makes it possible to manufacture efficiently and easily a superfine magnetic metal powder of satisfactory properties. Naturally, the present invention is effective for providing a high density magnetic recording medium with a low cost.

I claim:

1. A method of manufacturing a superfine magnetic metal powder comprising reacting at least one gaseous metal halide selected from the group consisting of iron, cobalt and nickel halides with hydrogen gas in a reaction region while supplying to said reaction region, an active gas having a higher reactivity with said gaseous metal halide than the reactivity of hydrogen gas with said gaseous metal halide whereby said metal of said gaseous metal halide is reduced and forms said superfine magnetic metal powder.

2. The method of manufacturing a superfine magnetic metal powder according to claim 1, wherein the amount of the active gas is from 0.001 to 10.0% based on the amount of the hydrogen gas.

3. The method of manufacturing a superfine magnetic metal powder according to claim 1, wherein the active gas and the hydrogen gas are supplied as a mixture.

4. The method of manufacturing a superfine magnetic metal powder according to claim 1, wherein the gaseous metal halide is reacted with the hydrogen gas immediately after the reaction between the gaseous metal halide and the active gas.

5. The method of manufacturing a superfine magnetic metal powder according to claim 2, wherein the active gas and the hydrogen gas are supplied as a mixture.

6. The method of manufacturing a superfine magnetic metal powder according to claim 2, wherein the gaseous metal halide is reacted with the hydrogen gas immediately after the reaction between the gaseous metal halide and the active gas.

7. The method of manufacturing a superfine magnetic metal powder according to claim 1, wherein said reaction region is at a temperature of from 900° to 1200° C., said metal halide is selected from the group consisting of $FeCl_2$, $CoCl_2$ and $NiCl_2$, and said active gas is in an amount of from 0.01 to 5% based on the amount of the hydrogen gas.

8. The method of manufacturing a superfine magnetic metal powder according to claim 7, wherein said active gas is oxygen which is reacted with the gaseous metal halide followed by reacting the hydrogen gas with the gaseous metal halide.

9. The method of manufacturing a superfine magnetic metal powder according to claim 7, wherein the active gas is hydrogen sulfide which is supplied with the hydrogen gas too said reaction region.

10. The method of manufacturing a superfine magnetic metal powder according to claim 7, wherein said metal is iron.

11. The method of manufacturing a superfine magnetic metal powder according to claim 8, wherein said metal is iron.

12. The method of manufacturing a superfine magnetic metal powder according to claim 9, wherein said metal is iron.

13. The method of manufacturing a superfine magnetic metal powder according to claim 7, wherein said metal is cobalt.

14. The method of manufacturing a superfine magnetic metal powder according to claim 8, wherein said metal is cobalt.

15. The method of manufacturing a superfine magnetic metal powder according to claim 9, wherein said metal is cobalt.

16. The method of manufacturing a superfine magnetic metal powder according to claim 7, wherein said metal is nickel.

17. The method of manufacturing a superfine magnetic metal powder according to claim 8, wherein said metal is nickel.

18. The method of manufacturing a superfine magnetic metal powder according to claim 9, wherein said metal is nickel.

* * * * *